United States Patent
Matoba

(10) Patent No.: US 8,099,038 B2
(45) Date of Patent: Jan. 17, 2012

(54) IMAGE FORMING APPARATUS, METHOD FOR CONTROLLING IMAGE FORMING APPARATUS, AND STORAGE MEDIUM

(75) Inventor: Tatsuo Matoba, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 413 days.

(21) Appl. No.: 12/476,990

(22) Filed: Jun. 2, 2009

(65) Prior Publication Data
US 2009/0304409 A1   Dec. 10, 2009

(30) Foreign Application Priority Data

Jun. 4, 2008 (JP) ................................. 2008-146995

(51) Int. Cl.
*G03G 15/00* (2006.01)
(52) U.S. Cl. ....................................... 399/404; 399/407
(58) Field of Classification Search .................... 399/82, 399/404, 407, 408, 410
See application file for complete search history.

(56) References Cited

U.S. PATENT DOCUMENTS

| 4,616,821 | A  | * | 10/1986 | Boeve et al. | 271/213 |
| 7,448,615 | B2 | * | 11/2008 | Takamura | 271/176 |
| 2008/0049242 | A1 | * | 2/2008 | Kimura | 358/1.12 |

FOREIGN PATENT DOCUMENTS

JP   2001-30584 A   2/2001

* cited by examiner

*Primary Examiner* — David Gray
*Assistant Examiner* — Gregory H Curran
(74) *Attorney, Agent, or Firm* — Canon U.S.A., Inc., IP Division

(57) ABSTRACT

An image forming apparatus for processing a print job includes an acquiring unit configured to acquire information about a set of printed sheets to be post-processed by a post-processing apparatus, the post-processing apparatus not being connected to the image forming apparatus via a conveying path of the print sheets output from the image forming apparatus, an analyzing unit configured to analyze the print job, and an output control unit configured to output printed sheets on the basis of the print job in which offset stacking is applied to each set of printed sheets to be post-processed as defined by the post-processing apparatus in accordance with a result of analysis performed by the analyzing unit and information regarding the set of printed sheets to be post-processed acquired by the acquiring unit.

18 Claims, 13 Drawing Sheets

IMAGE FORMING APPARATUS, METHOD FOR CONTROLLING IMAGE FORMING APPARATUS, AND STORAGE MEDIUM

BACKGROUND OF THE INVENTION

1. Field of the Invention

The present invention relates to an image forming apparatus capable of offset stacking each set of output paper sheets to be post-processed in the same batch by a nearline or offline post processing apparatus, a method for controlling the image forming apparatus, and a storage medium with a program and/or computer-executable instructions for executing the method for controlling the image forming apparatus.

2. Description of the Related Art

In general, to obtain printouts, after a printing apparatus completes printing, an operator delivers a set of printed paper sheets to a post-processing apparatus (i.e., a finisher) installed at a location remote from the printing apparatus, where the post-processing apparatus performs post-processing.

In addition, when a printing apparatus prints a plurality of copies of a document, the printing apparatus can offset stack each of the copies of the document so that an operator can readily distinguish the different sets of copies.

Furthermore, in order to separate printed sheets of paper into several sets, Japanese Patent Laid-Open No. 2001-30584 describes a technology for separating a print job into sub-jobs so that the number of sheets of a sub-job does not exceed the maximum number of sheets defined by an inline booklet finisher.

However, in the above-described existing technology, offset stacking in accordance with a set of printed sheets to be post-processed by the downstream nearline or offline post-processing apparatus cannot be achieved. Accordingly, an operator may be required to manually separate the sets of printed sheets before placing the set of sheets in the post-processing apparatus. Alternatively, an operator may be required to compute the number of sheets corresponding to the set of sheets to be post-processed and input the number of sheets for offset stacking to an operation unit of the printing apparatus. In order to perform these operations, the operator may need to learn how to operate the post-processing apparatus or set an appropriate setting in the printing apparatus.

In such a case, by using the technology described in Japanese Patent Laid-Open No. 2001-30584, the job can be separated into sub-jobs so that the number of sheets of a sub-job does not exceed the maximum number of sheets defined by an inline booklet finisher. However, this technology does not take into account the processing performed by the downstream nearline or offline post-processing apparatus remote from the printing apparatus. Therefore, a separating operation performed by an operator may still be needed.

SUMMARY OF THE INVENTION

According to one aspect of the invention, an image forming apparatus for processing a print job is provided. The image forming apparatus includes an acquiring unit configured to acquire information about a set of printed sheets to be post-processed by a post-processing apparatus, the post-processing apparatus not being connected to the image forming apparatus via a conveying path of the print sheets output from the image forming apparatus, an analyzing unit configured to analyze the print job, and an output control unit configured to output printed sheets on the basis of the print job in which offset stacking is applied to each set of printed sheets to be post-processed as defined by the post-processing apparatus in accordance with a result of analysis performed by the analyzing unit and information regarding the set of printed sheets to be post-processed acquired by the acquiring unit.

Further features of the present invention will become apparent from the following description of exemplary embodiments with reference to the attached drawings.

DESCRIPTION OF THE EMBODIMENTS

Various exemplary embodiments of the present invention are described in detail below with reference to the accompanying drawings.

An image forming apparatus according to a first embodiment of the present invention is described below.

Figure 1:
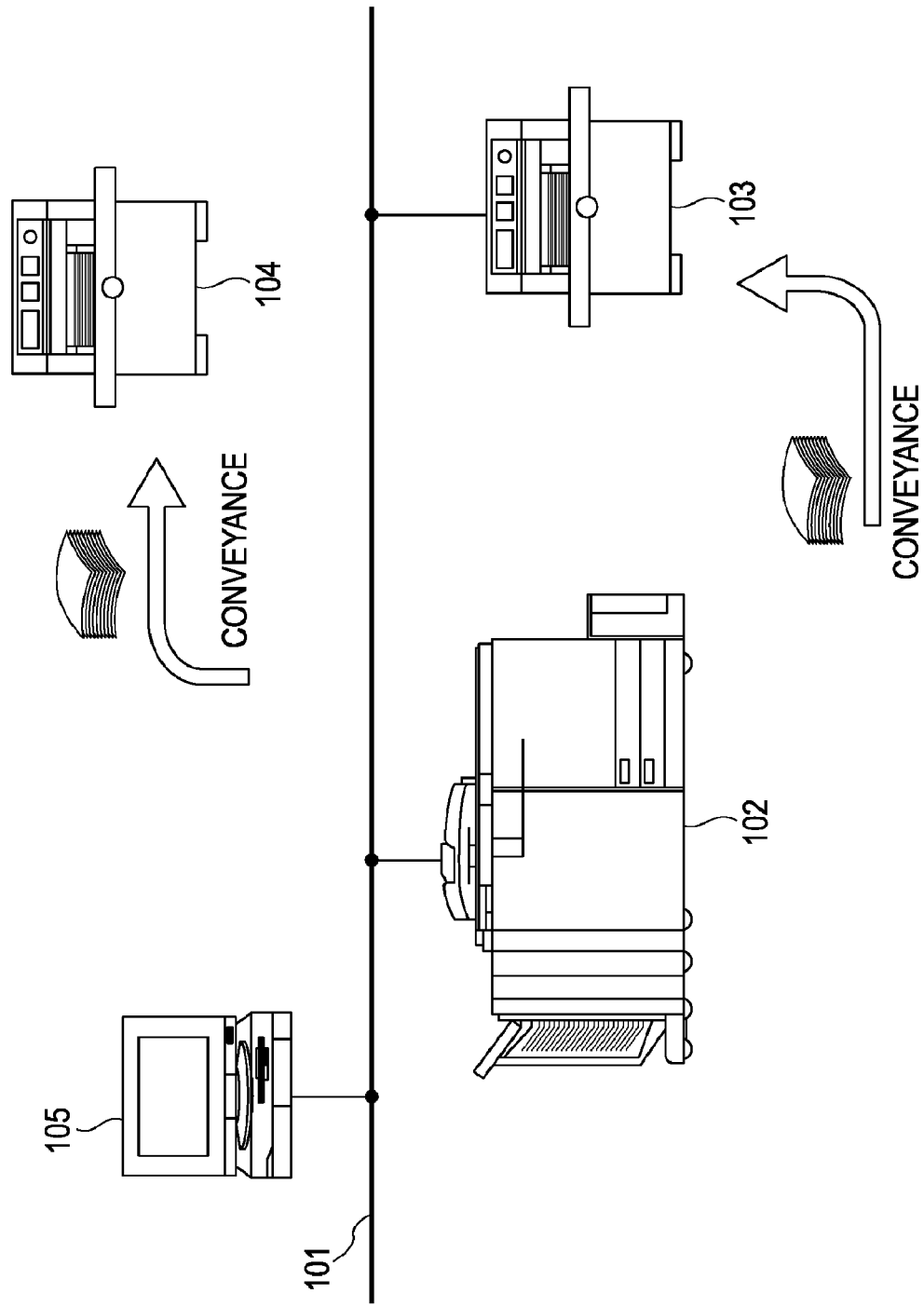
FIG. 1 is a block diagram of an exemplary configuration of an image forming system according to an embodiment of the present invention.

FIG. 1 is a configuration diagram of an image forming system including an image forming apparatus according to the first embodiment of the present invention. As shown in FIG. 1, a printing apparatus 102 functioning as the image forming apparatus according to the first embodiment of the present invention, a nearline post-processing apparatus 103, and a work personal computer (PC) 105 are connected to one another via a network 101. In addition, the image forming system includes an offline post-processing apparatus 104.

The printing apparatus 102 serves as an image forming apparatus having a variety of functions, such as one or more of scanning, printing, copying, and box functions. Such an image forming apparatus is referred to as a "multi function peripheral (MFP)". MFPs may be categorized into two types:

monochrome MFPs and color MFPs. The printing speeds and costs of the two types are different. Accordingly, one of the two types may be selected in accordance with the intended use. A variety of optional units can be inline-connected to the printing apparatus 102. Examples of the optional units include a stacker that contains a large number of output printed sheets and a paper deck that contains a large number of sheets to be fed.

The nearline post-processing apparatus 103 can perform post-processing on printed paper sheets output from the printing apparatus 102. According to the embodiment as shown in FIG. 1, an operator takes a set of the printed sheets of paper output from the printing apparatus 102 to the nearline post-processing apparatus 103 and sets the set of the printed sheets in a paper feed port of the nearline post-processing apparatus 103. Thereafter, the nearline post-processing apparatus 103 performs post-processing in accordance with an operating instruction sent from the work PC 105 or the printing apparatus 102 via the network 101.

The offline post-processing apparatus 104 can also perform post-processing on printed sheets of paper output from the printing apparatus 102. The offline post-processing apparatus 104 is not connected to the network 101. Accordingly, in the embodiment as shown in FIG. 1, an operator manually operates the offline post-processing apparatus 104. For example, an operator may take a set of the printed paper sheets output from the printing apparatus 102 to the offline post-processing apparatus 104, and may set the set of the printed sheets in a paper feed port of the offline post-processing apparatus 104. Subsequently, the operator can input post-processing settings into an operation unit of the offline post-processing apparatus 104. Thus, a finishing operation may be performed.

That is, the nearline post-processing apparatus 103 and the offline post-processing apparatus 104 may be the same in that a conveying path of a sheet of paper that is to be post-processed is not connected to the printing apparatus 102. However, the nearline post-processing apparatus 103 is different from the offline post-processing apparatus 104 in that, although the nearline post-processing apparatus 103 is connected to the printing apparatus 102 via the network 101, the offline post-processing apparatus 104 is not.

Particular examples of the nearline post-processing apparatus 103 and the offline post-processing apparatus 104 can include one or more of a puncher, a sheet folder, a stapler, and a book binding machine. However, any other apparatuses that perform post-processing may also be included.

While the embodiment of the image forming system shown in FIG. 1 includes one nearline post-processing apparatus 103 and one offline post-processing apparatus 104, the image forming system may also include only one of the nearline post-processing apparatus 103 and the offline post-processing apparatus 104. Alternatively, the image forming system may include a plurality of the nearline post-processing apparatuses 103 and a plurality of the offline post-processing apparatuses 104. Still alternatively, a combination of a plurality of post-processing apparatuses may perform a single type of post-processing.

The work PC 105 may be formed from a widely used information processing apparatus (e.g., a computer) that includes a network connection unit in addition to a central processing unit (CPU), a read only memory (ROM), a random access memory (RAM), and a hard disk drive (HDD). The work PC 105 may be used for editing an input application file and sending a print instruction. In addition, the work PC 105 may be used for a management operation by, for example, receiving and setting the parameters of the printing apparatus 102 and the nearline post-processing apparatus 103 using an Internet browser.

While the present embodiment is described hereinafter with reference to a local area network (LAN) for the network 101, any other network system, such as the Internet, may also be employed for the network 101.

Figure 2:
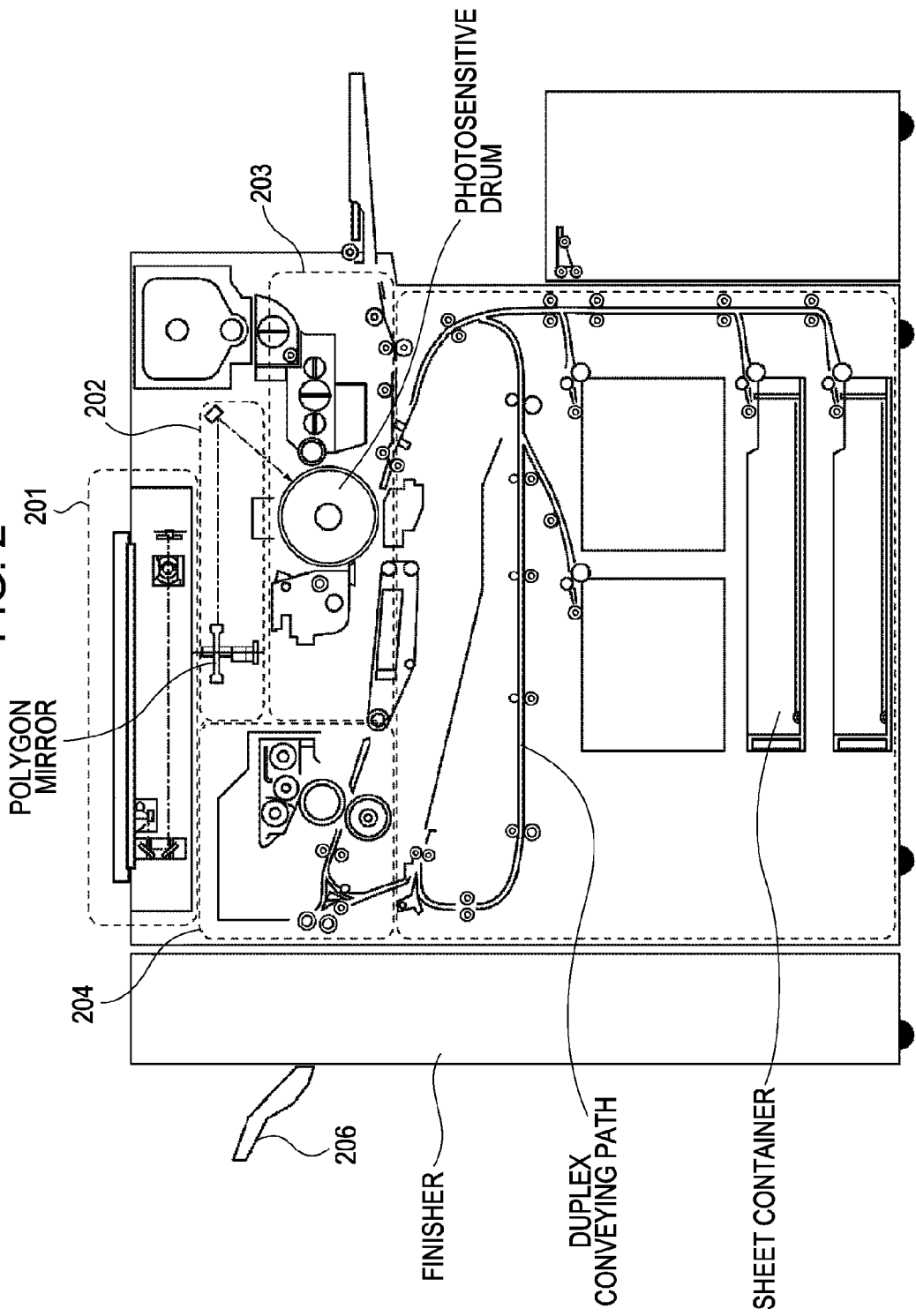
FIG. 2 is a schematic diagram illustrating an exemplary internal configuration of a printing apparatus.

FIG. 2 illustrates an exemplary internal configuration of the printing apparatus 102 serving as an image forming apparatus according to the present embodiment of the present invention. MFPs may be categorized into full-color MFPs and monochrome MFPs. Since full-color MFPs and monochrome MFPs have similar basic configurations except for color processing and internal data structures, description is made herein with reference to a full-color MFP.

The printing apparatus 102 as shown in the embodiment of FIG. 2 is a 1D-color MFP. The printing apparatus 102 according to this embodiment includes a scanner unit 201, a laser exposure unit 202, a photosensitive drum, an image forming unit 203, a fuser unit 204, a feeder/conveyer unit 205, and a MFP control unit 300 that controls these units. The MFP control unit 300 is described in more detail below.

The scanner unit 201 emits light to a document placed on a platen and optically scans a document image. The scanner unit 201 then converts the scanned document image to an electrical signal so as to generate image data.

The laser exposure unit 202 emits a light beam, such as a laser beam, modulated in accordance with the image data to a polygon mirror rotating at a constant angular velocity so as to obtain a reflection scanning beam. The laser exposure unit 202 then emits the reflection scanning beam to the photosensitive drum.

The image forming unit 203 rotationally drives the photosensitive drum and charges the photosensitive drum using a charger. Thereafter, the image forming unit 203 develops, using toner, a latent image formed on the photosensitive drum by the laser exposure unit 202. Subsequently, the image forming unit 203 transfers the developed toner image to a sheet of paper. The image forming unit 203 then collects fine toner particles that were not used for the development and remain on the photosensitive drum. By repeating such a series of electrophotographic processes, the image forming unit 203 forms images. The sheet of paper may be wrapped around a transfer belt at a predetermined location. During four revolutions, development units (e.g., development stations) having magenta (M) toner, cyan (C) toner, yellow (Y) toner, and black (K) toner perform the above-described series of electrophotographic processes in turn. After four revolutions are completed, the sheet of paper has a four-full-color toner image transferred thereon. The sheet is separated from the photosensitive drum and is conveyed to the fuser unit 204.

The fuser unit 204 includes a combination of rollers and belts. The fuser unit 204 further includes a heat source, such as a halogen heater. The fuser unit 204 melts and fixes, using heat and pressure, the toner that was transferred onto the sheet by the image forming unit 203 and that formed a toner image.

The feeder/conveyer unit 205 includes at least one sheet container, such as a sheet cassette, a paper deck, or a stack tray. In response to an instruction received from the MFP control unit 300, the feeder/conveyer unit 205 picks a sheet from a plurality of sheets contained in the sheet container and conveys the sheet to the image forming unit 203 and the fuser unit 204. The sheet is wrapped around the photosensitive drum of the image forming unit 203 and is rotated four times. Thereafter, the sheet is conveyed to the fuser unit 204. During the four revolutions, the above-described Y, M, C, and K color toner images are transferred to the sheet. When an image is formed on both sides of the sheet, control is performed so that the sheet that has passed the fuser unit 204 is led to a conveying path for conveying the sheet to the image forming unit 203 again.

If an inline finisher unit is connected, the sheet ejected from the fuser unit 204 enters the inline finisher unit. The inline finisher unit can include trays 206, such as a sample tray and a stack tray, onto which the sheet is ejected. The sheet is selectively discharged onto the sample tray and the stack tray in accordance with the type of job and the number of sheets to be discharged.

Sorting may be performed using one of the following two methods: a bin sort method and a shift sort method. In the bin sort method, the inline finisher unit includes a plurality of bins, and printed sheets are output to the selected bin and are sorted. In the shift sort method, by using an electronic sort function and shifting a bin (or the tray 206) in the forward-backward direction, the output sheets can be sorted. The electronic sort function is referred to as "collation". By providing a large-capacity memory to a core unit and using the large-capacity memory for a buffer memory, pages can be buffered. The order of the pages in the buffer memory and the output order of the pages can be changed. By using this collation function, the electronic sort function can be provided. In contrast to the sort function in which sorting is performed on a job-by-job basis, a group function provides sorting on a same-page basis.

In addition, when a staple mode is set for a job to be output, control can be performed so that sheets are output into a stack tray. In such a case, before the sheets are output into the stack tray, the sheets are sequentially stored in a processing tray provided in the finisher for each job, and the sheets stacked on the processing tray are bound using a stapler. Subsequently, the bundle of the sheets is output into the stack tray.

The MFP control unit 300 may perform overall control of the printing apparatus 102. In addition, the MFP control unit 300 may send instructions in order to manage the states of one or more of the above-described scanner unit, laser exposure unit, image forming unit, and fuser unit. Thus, these units may be capable of smoothly operating in synchronization with one another.

In addition, the image forming system may include a plurality of image forming apparatuses or a combination of a plurality of image forming apparatuses. Alternatively, the image forming system may include a combination of an image forming apparatus and a single function peripheral (SFP) having only a print function, or a combination of an image forming apparatus and an information processing apparatus (e.g., the work PC 105). That is, any configuration that can provide control according to aspects of the present embodiment can be employed.

Figure 3:
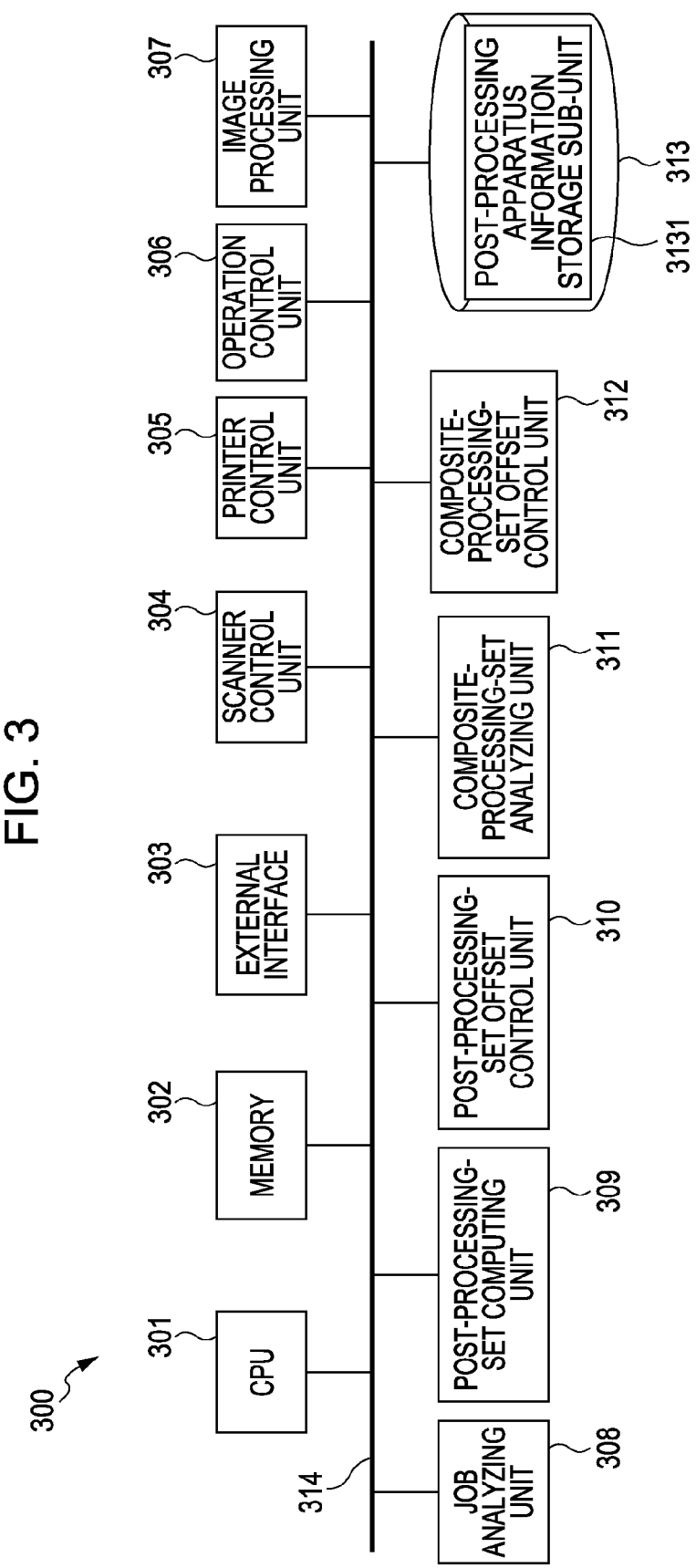
FIG. 3 is a block diagram of an exemplary configuration of an MFP control unit.

FIG. 3 is a block diagram illustrating an exemplary configuration of the MFP control unit 300 included in a printing apparatus 102 serving as the image forming apparatus according to the present embodiment of the invention shown in FIG. 2.

As shown in the embodiment of FIG. 3, the MFP control unit 300 includes processing modules 304, 305, 306, 307, 308, 309, 310, 311, and 312. These processing modules are application programs used by a CPU 301 and modules running as parts of the programs. These processing modules may also collectively be referred to as an "output control unit" for performing output processing.

As shown in the embodiment of FIG. 3, the MFP control unit 300 includes an information storage unit 313, which includes a post-processing apparatus information storage sub-unit 3131. Examples of the information storage unit 313 include a nonvolatile hard disk and a nonvolatile memory. Information may be stored in the information storage unit 313 using a file system or a database system. The information stored in the information storage unit 313 may be accessible using, for example, a particular key or condition.

The CPU 301 may perform overall control of the printing apparatus 102. In addition, by reading the programs stored in a memory 302 and the information storage unit 313 and executing the programs, the CPU 301 may realize one or more of scanning, printing, and facsimile operations.

The memory 302 includes a ROM for storing a variety of programs executed by the CPU 301 and a RAM for temporarily storing data used for control. In terms of the programs, the processing module 304 functions as a scanner control unit 304. The processing module 305 functions as a printer control unit 305. The processing module 306 functions as an operation control unit 306. The processing module 307 functions as an image processing unit 307. The processing module 308 functions as a job analyzing unit 308. The processing module 309 functions as a post-processing-set computing unit 309. The processing module 310 functions as a post-processing-set offset control unit 310. The processing module 311 functions as a composite-processing-set analyzing unit 311. The processing module 312 functions as a composite-processing-set offset control unit 312.

An external interface 303 may allow information to be communicated between the MFP control unit 300 and each of the work PC 105 and the nearline post-processing apparatus 103 via the network 101 or a removable external storage unit.

The scanner control unit 304 may drive the scanner unit 201 in accordance with instructions received from the CPU 301 so that the scanner unit 201 scans a document placed on the platen and stores the scanned document in the memory 302.

The printer control unit 305 may acquire image data from the memory 302 or the information storage unit 313 in accordance with instructions received from the CPU 301. Thereafter, the printer control unit 305 controls the laser exposure unit 202, the image forming unit 203, the fuser unit 204, and the feeder/conveyer unit 205 so that an image is printed on a sheet of paper.

The operation control unit 306 may control an operation unit provided to the printing apparatus 102 in accordance with instructions received from the CPU 301. The operation unit can include a touch-sensitive panel and a key input sub-unit. When the operation unit is operated by an operator, information may be sent to a variety of the units. Thus, the printing apparatus 102 operates accordingly.

The image processing unit 307 may perform, in accordance with instructions received from the CPU 301, image processing and processing for increasing the quality of an image that the operator selects through the operation control unit 306. In addition, the image processing unit 307 may analyze image data stored in the memory 302 by the scanner control unit 304. Furthermore, when a facsimile image is transmitted, the image processing unit 307 may convert the resolution and a paper size of image data to be sent in accordance with the performance of a facsimile machine that receives the image data.

The job analyzing unit 308 may analyze, in accordance with instructions received from the CPU 301, operating instructions contained in a print job received from the operation control unit 306 or the work PC 105 via the network 101. The print job analyzed by the job analyzing unit 308 may include at least one of rendering data representing a rendered image of a printout and operating instruction information representing print setting information. Examples of the operating instruction information include a job ticket indicating operating instructions called a job definition format (JDF). By communicating information based on a job ticket among the work PC 105, the printing apparatus 102, and the nearline post-processing apparatus 103, a job can be transmitted, and control commands can be submitted. In this way, a print work flow among these units can be realized. The job analyzing unit 308 can analyze information about a job ticket so as to acquire the information about post-processing to be performed after the printout of the job is output and information about a post-processing apparatus that performs the post-processing (e.g., the nearline post-processing apparatus 103).

The post-processing-set computing unit 309, in accordance with instructions received from the CPU 301, may be capable of computing the number of sheets in one set used for post-processing of the job using the information about the nearline post-processing apparatus 103 acquired by the job analyzing unit 308. That is, the post-processing-set computing unit 309 may obtain the number of sheets capable of being set in the post-processing apparatus in the same batch.

The post-processing-set offset control unit 310, in accordance with instructions received from the CPU 301, may operate in cooperation with the printer control unit 305 so as to offset-stack printed sheets onto one of the trays 206 every time the number of sheets in one post-processed set for the job computed by the post-processing-set computing unit 309 is reached.

The composite-processing-set analyzing unit 311 may operate in response to instructions received from the CPU 301 so as to determine whether the number of sheets in one post-processed set for the job computed by the post-processing-set computing unit 309 is different from the number of sheets in one copy of the job by at least a predetermined threshold value. The predetermined threshold value is registered in the post-processing apparatus information storage sub-unit 3131 of the information storage unit 313 as a "composite-processing-set offset determination threshold value" in advance. An example of the threshold value is a value indicating that the number of sheets in one post-processed set is twice the number of sheets in one copy set.

When outputting printed sheets onto one of the trays 206, the composite-processing-set offset control unit 312 may be capable of offset-stacking each of the sets of sheets to be post-processed in accordance with the composite processing set setting determined by the composite-processing-set analyzing unit 311. At the same time, the composite-processing-set offset control unit 312 may be capable of outputting a separator sheet on top of each of the copy sets.

The post-processing apparatus information storage sub-unit 3131 may store information about the nearline post-processing apparatus 103 and the offline post-processing apparatus 104. Examples of the information registered in the post-processing apparatus information storage sub-unit 3131 may include at least one of the name, the type, and the IP address of the post-processing apparatus, the thickness of a sheet that the post-processing apparatus can process in the same batch, and information about a region processed by the post-processing apparatus. Furthermore, the "composite-processing-set offset determination threshold value" may be stored in the post-processing apparatus information storage sub-unit 3131. The "composite-processing-set offset determination threshold value" can be used for determination made by the composite-processing-set analyzing unit 311 when the composite-processing-set analyzing unit 311 offset-stacks each of the sets of sheets to be post-processed and outputs a separator sheet on top of each of the copy sets.

Note that, according to the present embodiment, the post-processing apparatus information storage sub-unit 3131 is not necessarily included in the information storage unit 313 of the MFP control unit 300 of the printing apparatus 102. For example, the post-processing apparatus information storage sub-unit 3131 may also be included in the work PC 105 connected via the network 101.

An internal bus 314 is used for connecting the above-described units with one another. Transfer of image data may be performed via the internal bus 314. In addition, instructions and setting values for these units may be communicated via the internal bus 314.

Figure 4:
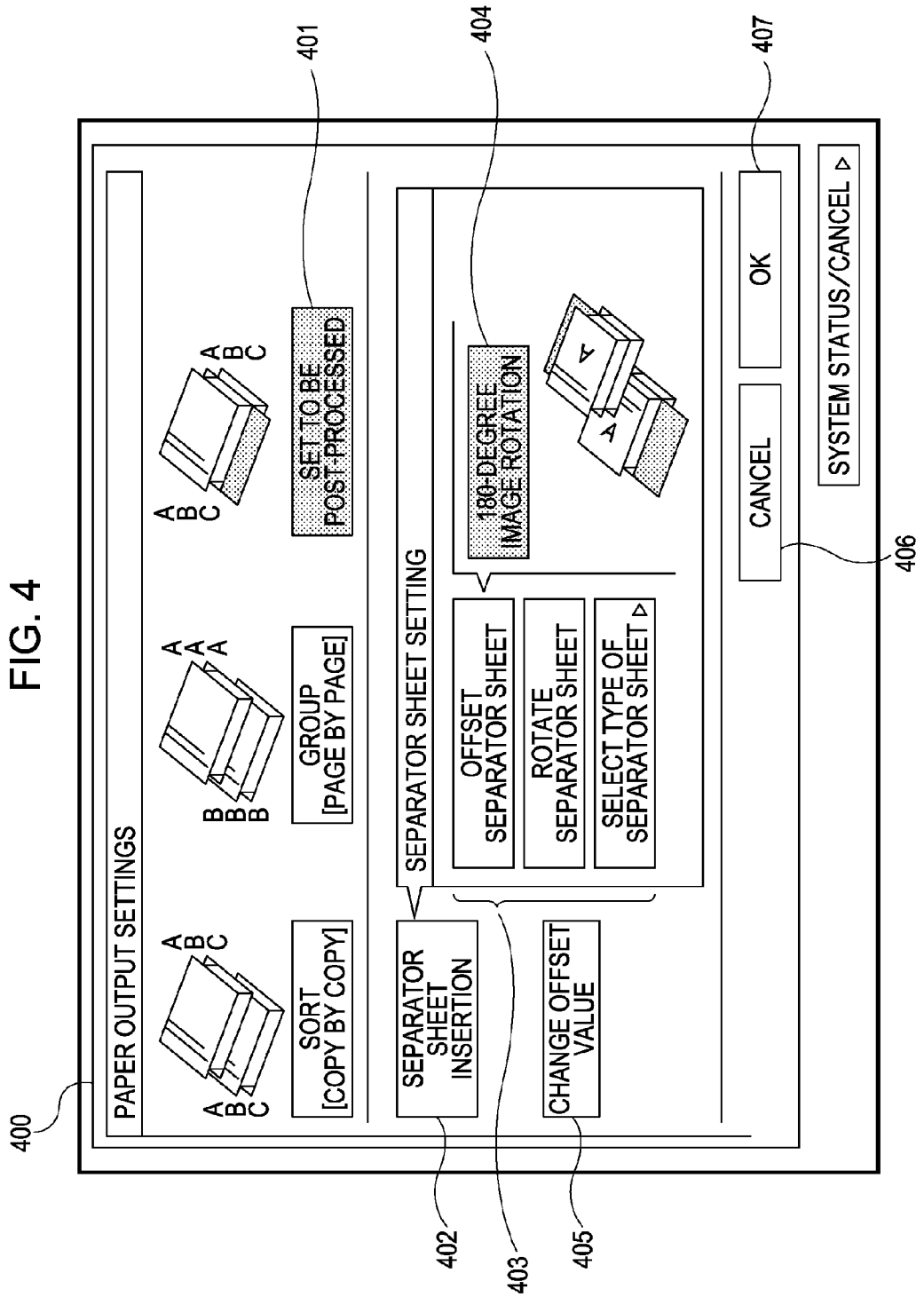
FIG. 4 illustrates an example of a paper output instruction screen.

FIG. 4 illustrates an example of a paper output instruction screen 400 used for outputting paper sheets while shifting on a post-processing set basis.

The paper output instruction screen 400 is an example of a screen displayed when the operator manipulates the operation unit of the printing apparatus 102 to change or examine the settings of a print job. Items displayed in the paper output instruction screen 400 may be registered in the post-processing apparatus information storage sub-unit 3131, and may be used by the job analyzing unit 308 and the composite-processing-set analyzing unit 311 when offset control is performed during outputting of printed sheets. While the present embodiment is described with reference to the paper output instruction screen 400 shown in FIG. 4 displayed on the operation unit of the printing apparatus 102, the paper output instruction screen 400 may also be displayed on the work PC 105 that submits the print job. In such a case, the paper output instruction screen 400 may be provided by a printer driver that generates a print job or software that generates a job ticket. When the paper output instruction screen 400 shown in FIG. 4 is displayed on the work PC 105, the information set through the paper output instruction screen 400 shown in FIG. 4 may be included in print setting information of a print job.

According to the example as shown in FIG. 4, a post-processing-set offset button 401 is pressed when each of the sets to be post-processed is to be offset-stacked.

A copy-by-copy separator sheet insertion button 402 is displayed if the post-processing-set offset button 401 is in a selection mode. The copy-by-copy separator sheet insertion button 402 is pressed when a separator sheet is to be inserted between copies and if sets of printed sheets to be post-processed are offset-stacked.

A separator sheet setting dialog 403 is displayed if the copy-by-copy separator sheet insertion button 402 is in a selection mode. The separator sheet setting dialog 403 is used for selecting a method for inserting a separator sheet at a break point between the copies of the output sheets. According to the present embodiment, the following three buttons are displayed for indicating the separator sheet insertion methods: a "separator sheet offset" button for shifting one separator sheet, a "separator sheet rotation" button for rotating a separator sheet by 90° and inserting the sheet, a "separator sheet selection" button for selecting a separator sheet from among, for example, color papers or sheets having different sizes. By pressing one of the buttons, the separator sheet insertion method can be determined.

An image rotation button 404 is displayed when a "separator sheet offset" setting is selected through the separator sheet setting dialog 403. By pressing the image rotation button 404, images are rotated by 180 degrees before being printed for each set of sheets to be post-processed. The operations performed and printouts output when the image rotation button 404 is pressed is described in more detail below with reference to FIG. 9.

An offset value change button 405 is displayed if the post-processing-set offset button 401 is in a selection mode. The offset value change button 405 is pressed when the offset value of sheets when the sheets are output on a post-processing set basis is changed and when the offset value of sheets when the sheets are shifted on a copy-by-copy basis is changed. For example, by using the offset value change button 405, the operator can set different offset values for sets to be post-processed and copy sets.

A cancel button 406 is pressed when activation of the settings displayed in the paper output instruction screen 400 is canceled for the job.

An OK button 407 is pressed when the settings displayed in the paper output instruction screen 400 are activated.

Figure 5:
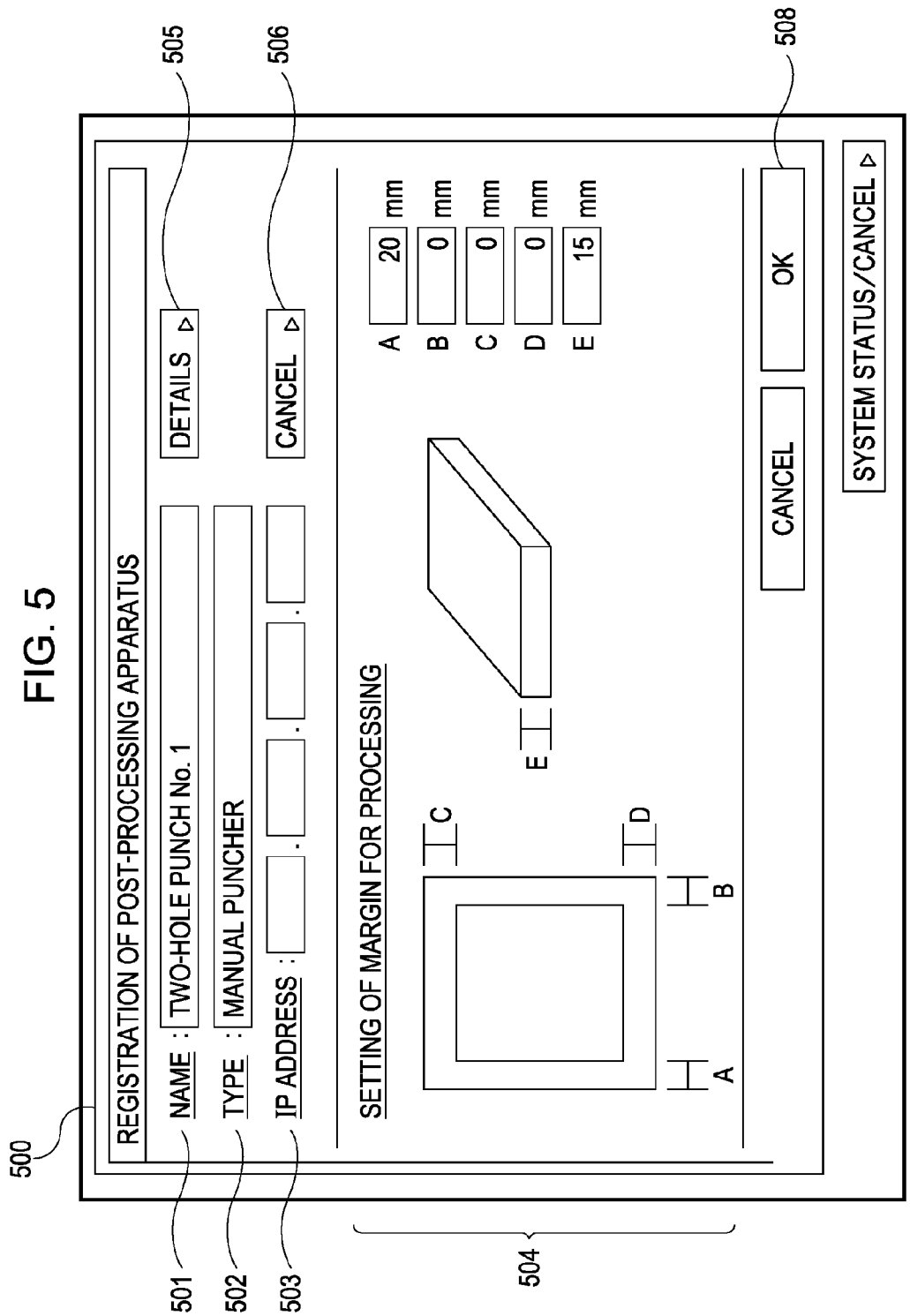
FIG. 5 illustrates an example of a post-processing apparatus setting screen.

FIG. 5 illustrates an example of a post-processing apparatus setting screen 500 for registering, in the post-processing apparatus information storage sub-unit 3131 of the printing apparatus 102, information about a post-processing apparatus for performing post-processing after the printing apparatus 102 outputs a print job.

The post-processing apparatus setting screen 500 may be displayed on the operation unit of the printing apparatus 102. By using the post-processing apparatus setting screen 500, the operator may be capable of registering a nearline post-processing apparatus or an offline post-processing apparatus, changing settings of the nearline post-processing apparatus or the offline post-processing apparatus, and examining the nearline post-processing apparatus or the offline post-processing apparatus. By using this screen, the operator can pre-register information about the nearline post-processing apparatus 103 or the offline post-processing apparatus 104. Using the registered information, the job analyzing unit 308 can analyze post-processing information contained in the print job when analyzing a print job. In addition, the post-processing-set computing unit 309 and the composite-processing-set analyzing unit 311 can compute a set to be post-processed and determine a method for offsetting the output sheets in accordance with the computed set to be post-processed.

A name field 501 is used for setting the name of a post-processing apparatus to be registered using a character string.

A type field 502 is used for setting the type of the post-processing apparatus to be registered using a character string.

An IP address field 503 is used for registering an address used in the network 101 when the post-processing apparatus to be registered is a nearline post-processing apparatus connectable to via the network 101. While the present embodiment is described with reference to an IP address, another type of address can also be employed.

A processing margin setting field 504 is displayed for setting, by using numeric values, the processing margin for each of four sides of the print sheet in a post-processing apparatus and the thickness that can be processed in the same batch.

By using a thickness value set through the processing margin setting field 504 ("15 mm" in a sub-field "E" in the example shown in FIG. 5), the post-processing-set computing unit 309 computes a post-processing set for the type of paper sheet used in the print job. In addition, by using a processing margin set through the processing margin setting field 504 ("20 mm" in a sub-field "A" in the example shown in FIG. 5), the size of a separator sheet is adjusted so that the separator sheet is not included in the processing margin when the composite-processing-set analyzing unit 311 inserts the separator sheet of the copies while offset-stacking each set of sheets to be post-processed.

A detailed information button 505 is used for activating a post-processing apparatus detailed setting screen used for setting detailed parameters concerning a post-processing apparatus. However, the post-processing apparatus detailed setting screen is not illustrated here.

A unit information acquisition button 506 is pressed in order to inquire into the unit configuration information when a post-processing apparatus to be registered is a nearline post-processing apparatus connected to the network 101. If the nearline post-processing apparatus is capable of responding to an inquiry of unit configuration information received from the outside, the printing apparatus 102 displays acquired unit configuration information in the corresponding fields of the post-processing apparatus setting screen 500.

An OK button 508 is pressed when the information displayed in the post-processing apparatus setting screen 500 is to be registered in the printing apparatus 102. The information set through the post-processing apparatus setting screen 500 is registered in the post-processing apparatus information storage sub-unit 3131.

A cancel button 509 is pressed when setting or updating of the information displayed in the post-processing apparatus setting screen 500 is not to be performed.

Note that an external apparatus, such as the work PC 105, may register, in the post-processing apparatus information storage sub-unit 3131 of the printing apparatus 102, information about a post-processing apparatus that performs post-processing after the printing apparatus 102 outputs a print job.

Figure 6:
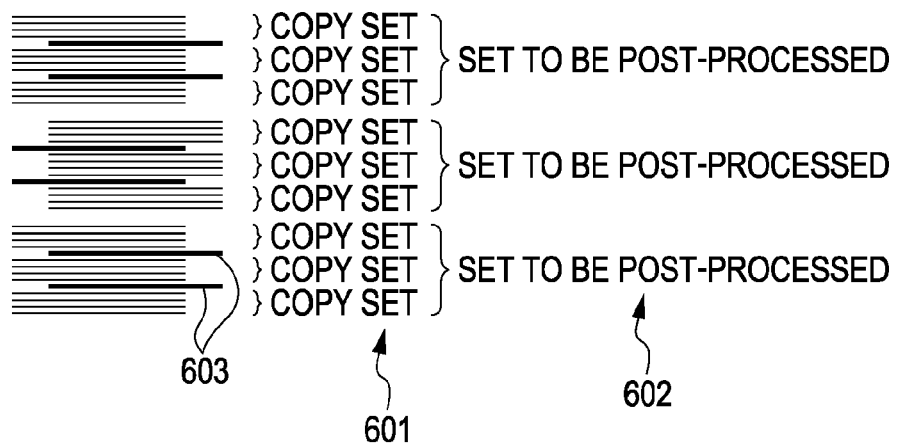
FIG. 6 is an example of offset-stacking of printed sheets based on a composite processing set when a set to be post-processed is larger than a copy set.

FIG. 6 is a schematic illustration of a printout output onto the tray 206 when adjacent sets of sheets to be post-processed in the same batch are offset from each other and a separator sheet is inserted between adjacent copies after the composite-processing-set analyzing unit 311 of the MFP control unit 300 analyzes a print job. This control is performed by the composite-processing-set offset control unit 312 that sends an instruction to a finisher unit.

In FIG. 6, a set of sheets to be post-processed 602 is larger than a quantity of a copy 601. A separator sheet 603 is offset-inserted between each set of a copy so that sets of sheets of a copy are distinguishable. In addition, by offsetting adjacent sets of sheets to be post-processed in the same batch, the sets of sheets to be post-processed in the same batch are distinguishable.

Figure 7:
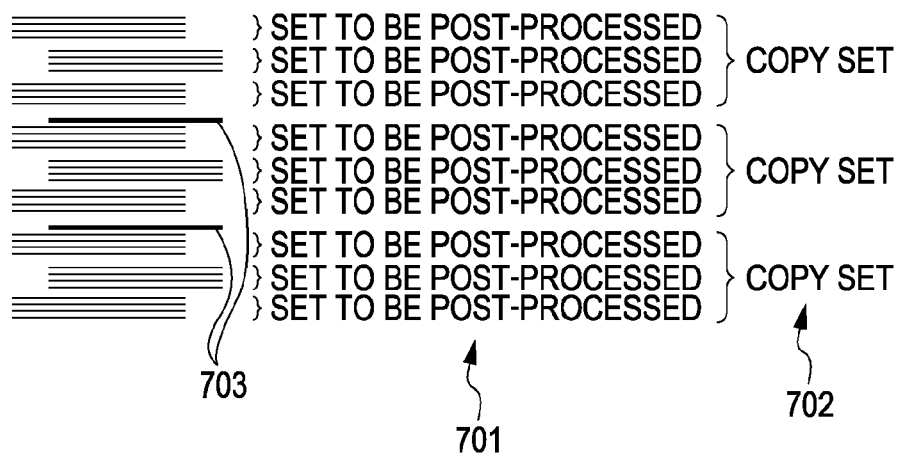
FIG. 7 is an example of offset-stacking of printed sheets based on a composite processing set when a set to be post-processed is smaller than a copy set.

Like FIG. 6, FIG. 7 is a schematic illustration of a printout output onto the tray 206 when the composite-processing-set analyzing unit 311 analyzes a print job so that adjacent sets of sheets to be post-processed in the same batch are offset from each other and a separator sheet is inserted between adjacent copies after the composite-processing-set analyzing unit 311 analyzes a print job.

In FIG. 7, a set of sheets to be post-processed 701 is smaller than a quantity of a copy 702. By offsetting adjacent sets of sheets to be post-processed in the same batch, the sets of sheets to be post-processed in the same batch are distinguishable. In addition, a separator sheet 703 is offset-inserted between each set of a copy so that sets of sheets of a copy are distinguishable.

Figure 8:
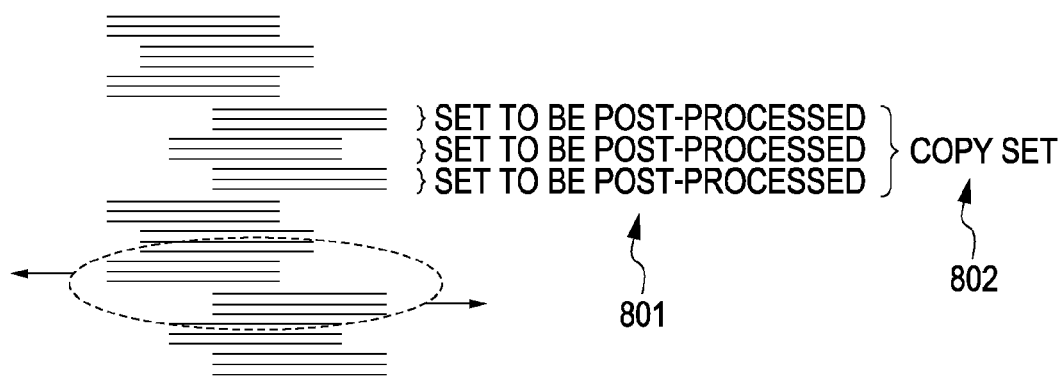
FIG. 8 is an example of offset-stacking of printed sheets based on a composite processing set when an offset value is changed.

FIG. 8 is a schematic illustration of a printout output onto the tray 206 when adjacent sets of sheets to be post-processed 801 are offset from each other using a certain offset distance and sets of copies 802 are offset from each other using different offset values after the composite-processing-set analyzing unit 311 analyzes a print job. This control is performed by the composite-processing-set offset control unit 312 instructing a finisher unit to change an offset value.

As shown in FIG. 8, the composite-processing-set offset control unit 312 performs control so that the orientation of images printed on the sheets is reversed. Accordingly, the offsetting of the sets of copies is clearly recognizable. However, the control shown in FIG. 8 can be performed only when the printing apparatus has a sheet offsetting feature based on any offset value.

Figure 9:
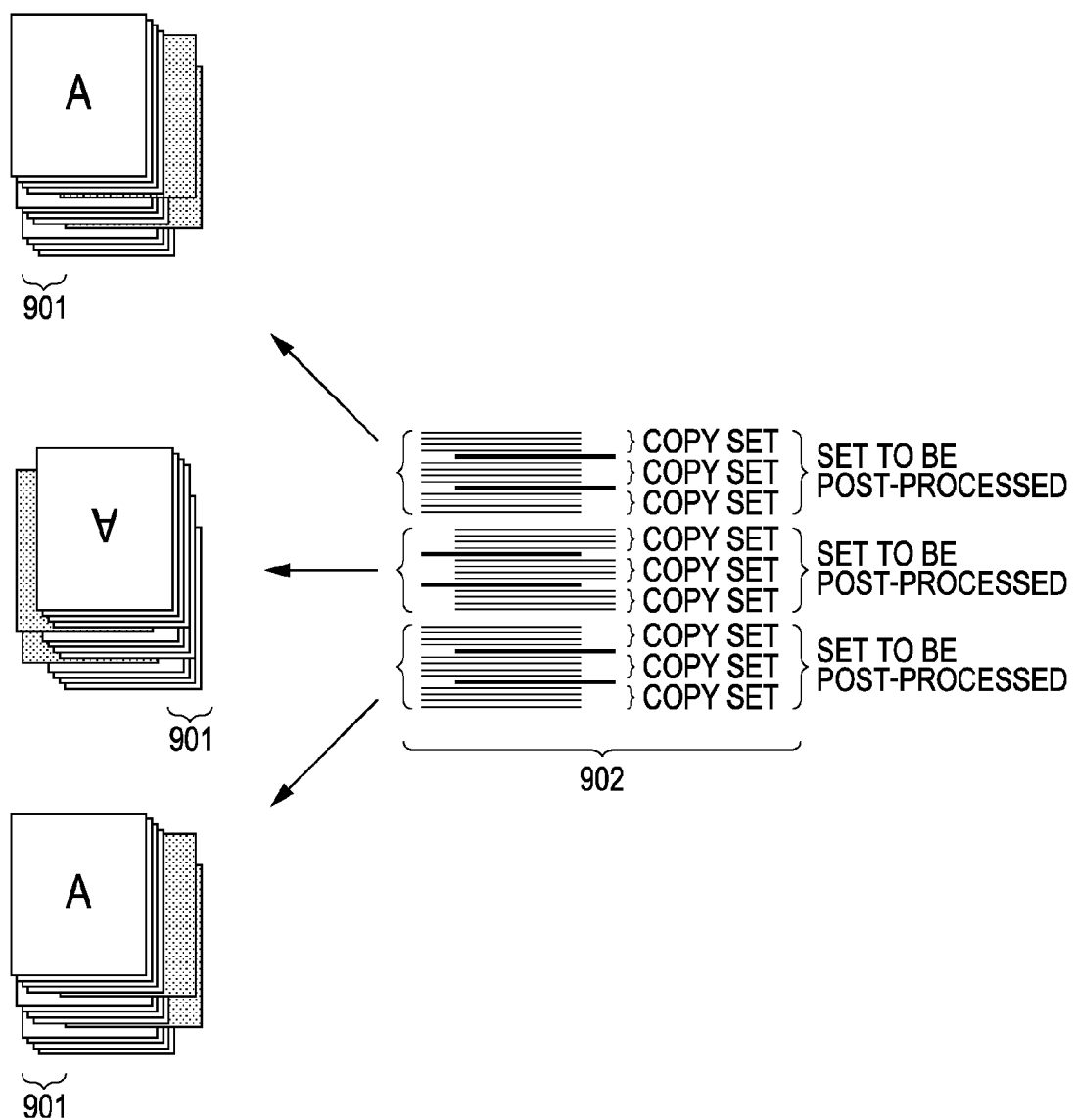
FIG. 9 is an example of offset-stacking of printed sheets based on a composite processing set when a printed image is rotated.

FIG. 9 is a schematic illustration of a printout output when the composite-processing-set analyzing unit 311 rotates by 180 degrees images to be printed on adjacent sets of sheets to be post-processed in order to make the orientations of the sets of sheets set in the post-processing apparatus the same.

For example, only when a printing apparatus offsets a printed sheet in one direction by a certain offset distance, can an operator set sets of printed sheets having the same image orientation in a post-processing apparatus by using this 180-degree image rotation capability.

Figure 10:
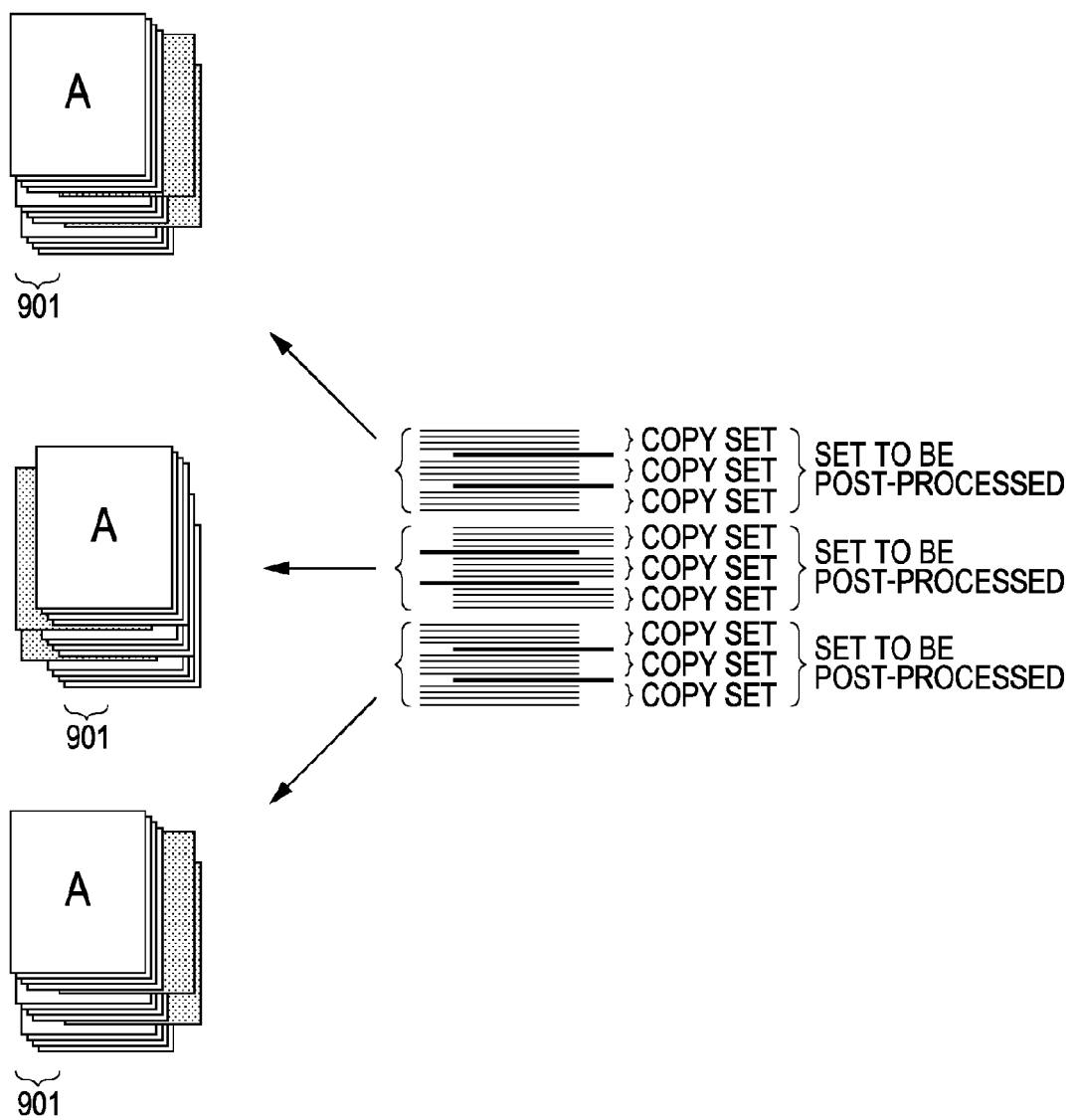
FIG. 10 is an example of offset-stacking of printed sheets based on a composite processing set when a printed image is not rotated.

FIG. 10 illustrates stacks of printed sheets output without using the 180-degree image rotation capability shown in FIG. 9. When, as described above, a printing apparatus has a capability of offsetting a printed sheet in one direction by one certain offset value 901, separator sheets are offset beyond the right edge of a first set of printed sheets to be post-processed.

Subsequently, when outputting a second set of printed sheets to be post-processed, the printing apparatus outputs the printed sheets while offsetting in the right direction so that the second set is distinguishable from the first set. Furthermore, in order to make a set of printed sheets for a copy distinguishable from an adjacent set, the printing apparatus inserts separator sheets without offsetting the separator sheets in the second set of printed sheet to be post-processed. As a result, in the second set of printed sheet to be post-processed, the separator sheets are placed beyond the left edge of the second set of printed sheets to be post-processed.

Subsequently, when outputting a third set of printed sheets to be post-processed, the printing apparatus performs offset control and separator sheet insertion so that printed sheets are output without being offset and separator sheets are output while being offset. Accordingly, the third set is easily distinguishable from the second set.

After the printing apparatus completes printing, the operator sets the printout shown in FIG. 10 in the post-processing apparatus. However, in the second set of printed sheets to be post-processed, the separator sheets are present in a margin of the sheets to be processed. Therefore, if, for example, punch holes are formed in the margin of the printed sheets, punch holes are also formed in the separator sheets. Thus, punch holes may not be formed in the printed sheets to be punched because of an upper limit of the number of sheets processed by the post-processing apparatus.

In such a case, by simply rotating by 180 degrees the second set of printed sheets to be post-processed having 180-degree rotated images as shown in FIG. 9 and setting the second set in the post-processing apparatus, the problem of the separator sheets being located in the margin to be processed can be solved. As a result, a problem of the separator sheets bound together with the printed sheets can be eliminated. Furthermore, post-processing can be performed on the printed sheets having the same orientation.

Still furthermore, since the separator sheets are inserted between the copy sets, as shown in FIG. 9, and the sets of printed sheets to be post-processed are offset-stacked, the user can set a printout 902 in sets of printed sheets to be post-processed and punch the sets of printed sheets in the same batch. In addition, by using the separator sheets, the user can easily separate the copies.

Figure 11:
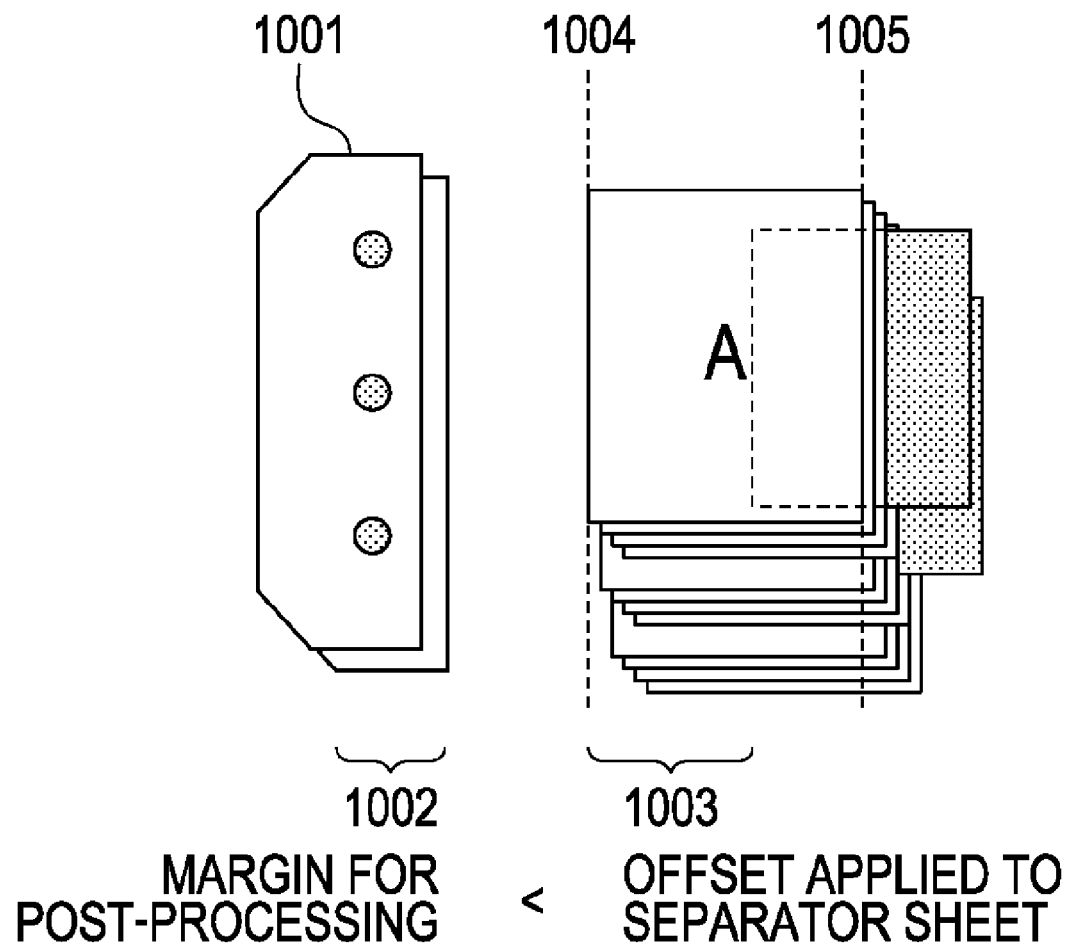
FIG. 11 is an example of offset-stacking of printed sheets based on a composite processing set when a separator sheet is changed to another separator sheet having a different size.

FIG. 11 is a schematic illustration of an example of a case in which a separator sheet having a smaller size (i.e., a second separator sheet) is used in order to prevent the separator sheet from entering a post-processed margin 1002 defined by a post-processing apparatus when a set of printed sheets to be post-processed is offset-stacked and the separator sheet is inserted between adjacent copies of a document. In this example, a manual puncher 1001 is employed as an example of the offline post-processing apparatus 104.

As shown in FIG. 11, the separator sheet (i.e., second separator sheet) has a size (e.g., an A5 size) that is smaller than that of a recording sheet (e.g., an A4 size). By inserting the separator sheet having such a size while offsetting the separator sheet, an offset value 1003 of the separator sheet can be increased. Accordingly, even when a stack of printed sheets is set in the manual puncher 1001 and is punched, the separator sheets are not punched. Consequently, the separator sheets need not be removed before the punching operation is performed.

Note that the processing shown in FIG. 11 can be performed only when the offset direction is the right direction and printing is performed by printing apparatuses that define a right side edge 1005 of a sheet as a reference position of offset. If the offset direction is the left direction, printing can be performed by only printing apparatuses that define a left side edge 1004 of a sheet as a reference position of offset.

Accordingly, the function illustrated in FIG. 11 can be performed by some printing apparatuses. In addition, printing apparatuses may perform the processing illustrated in FIG. 11 when a separator sheet enters the post-processed margin of a page even after the separator sheet is offset.

By applying the processing illustrated in FIG. 11, the case in which post-processing is applied to both a printed sheet and a separator sheet, even when the separator sheet is offset (i.e., the case in which a separator sheet enters the post-processed margin of a page), can be prevented.

Figure 12A:
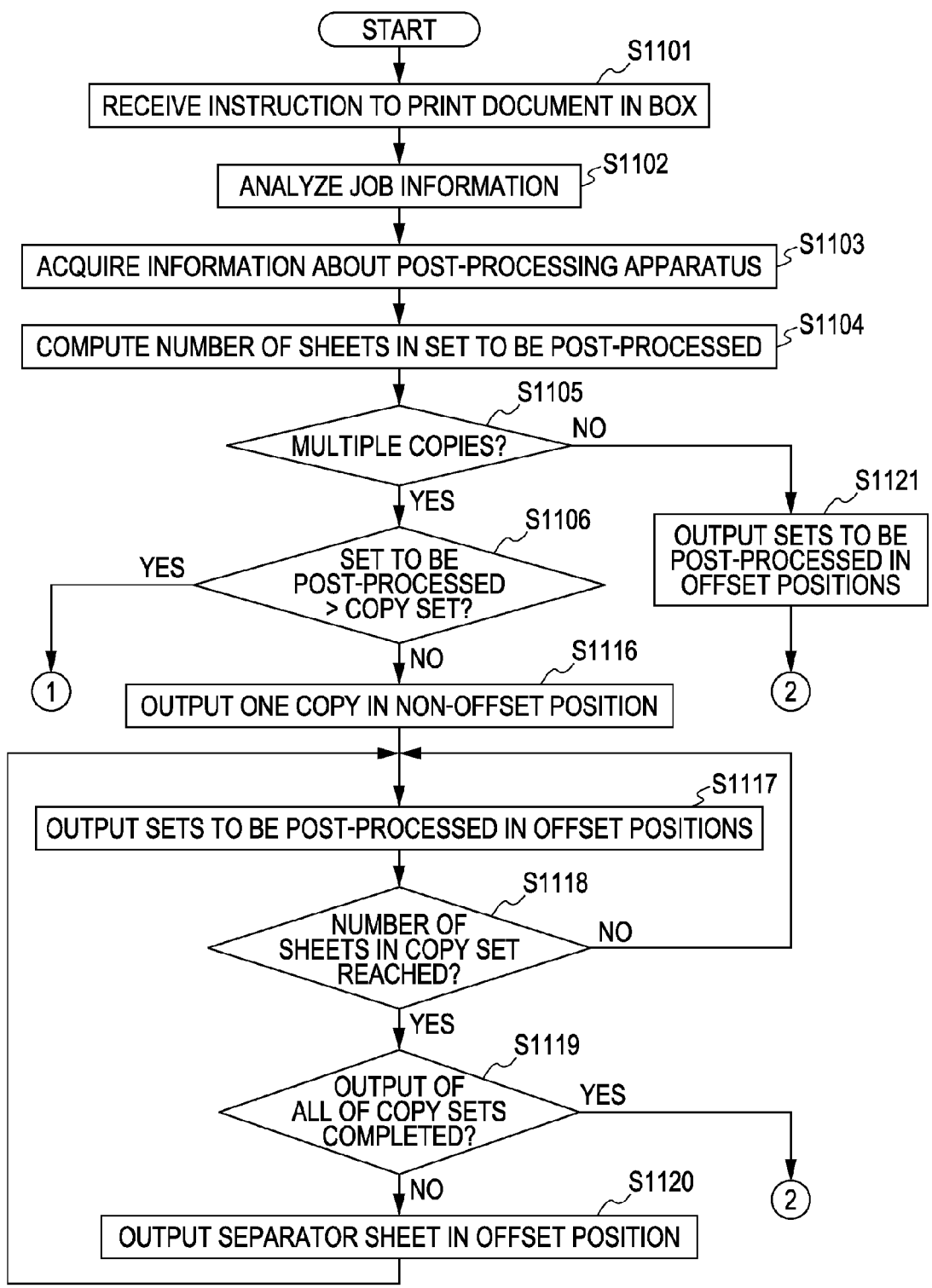
FIGS. 12A-12B are flow charts of examples of an offset-stacking process of printed sheets based on a composite processing set.
Figure 12B:
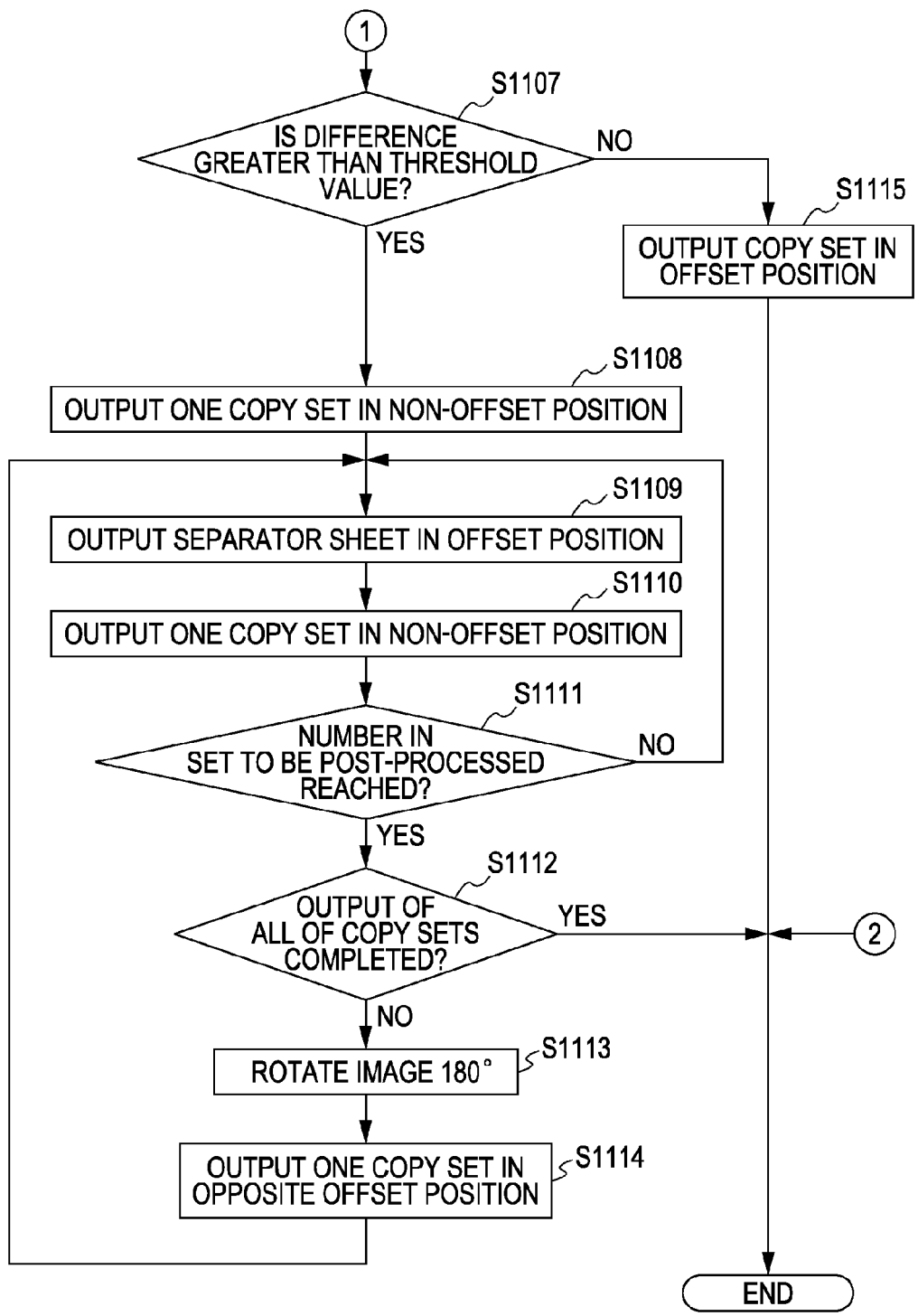

FIGS. 12A through 12B are flowcharts illustrating an example of a series of processes from analysis of print job information to offset stacking of a set of printed sheets to be post-processed. The steps of the process flow described below may be performed by the CPU 301 of the printing apparatus 102 controlling the processing modules.

In step S1101 of FIG. 12A, the printing apparatus 102 receives an instruction to select a document from a document storage region (e.g., a box) of the information storage unit 313 and print the document. Hereinafter, description of FIGS. 12A through 12B is made with reference to the case where a document that is prestored in the box of the printing apparatus 102 is printed. However, the description can also be applied to the case where the printing apparatus 102 receives a print job from the work PC 105 and prints the print job. In addition, in the processing shown by the flowchart in FIGS. 12A through 12B, the operator may select offset stacking of a set of printed sheets to be post-processed when instructing printing.

In step S1102, the job analyzing unit 308 analyzes job information associated with a selected document (e.g., a job ticket, such as JDF). Thus, the job analyzing unit 308 acquires print setting information about the job (e.g., one or more of the number of pages, the number of copies, the sheet size, and the type of sheet), post-processing information about printed sheets (e.g., two-hole punch on the left side of a page), and information about a post-processing apparatus suitable for the post-processing (e.g., the offline post-processing apparatus 104).

In step S1103, the job analyzing unit 308 acquires, from the post-processing apparatus information storage sub-unit 3131, information about the capabilities of the offline post-processing apparatus 104 used for post-processing of the job. The acquired information about the capabilities of the offline post-processing apparatus 104 includes information about a set of printed sheets that may be post-processed (e.g., one or more of the height of a stack of the sheets and the position of the post-processed margin and the width of the post-processed margin), as described in the example of the processing margin setting field 504 of the post-processing apparatus setting screen 500 shown in FIG. 5. Note that processing performed in step S1103 can be also applied to the case where information is acquired from a nearline post-processing apparatus.

In step S1104, the post-processing-set computing unit 309 computes the size of the set of printed sheets to be post-processed. In order to compute the size of the set of printed sheets to be post-processed, the job analyzing unit 308 divides the height of a processible stack of printed sheets included in the information about the offline post-processing apparatus 104 by the thickness of a sheet of the type included in the print setting information acquired through the analysis performed in step S1102. Thus, the job analyzing unit 308 computes the number of sheets that can be processed in the same batch. Note that, while the present embodiment has been described with reference to the case in which the size of the set of printed sheets to be post-processed is computed, the present invention is not limited to such a case. For example, the printing apparatus 102 may separately store the number of sheets that may be post-processed in a set for each post-processing apparatus and each type of sheet.

In step S1105, if multiple copies are specified in the print setting information of the job (Yes in step S1105), the processing of the printing apparatus 102 proceeds to step S1106. However, if a single copy is specified (No in step S1105), the processing proceeds to step S1121.

In step S1121, the post-processing-set offset control unit 310 outputs a set of printed sheets to be post-processed, which is determined through the computation in step S1104, onto the trays 206 while offsetting the printed sheets in cooperation with the printer control unit 305.

In step S1106, the composite-processing-set analyzing unit 311 determines whether the size of the set to be post processed is larger than the size of a single copy.

If, in step S1106, it is determined that the size of the set to be post processed is larger than the size of a single copy (Yes in step S1106), the processing proceeds to step S1107, as shown in FIG. 12B.

In step S1107, the composite-processing-set analyzing unit 311 determines whether a difference between the number of sheets in a single copy set of the job and the number of sheets in the set to be post-processed computed in step S1104 is greater than or equal to a predetermined threshold value (i.e., whether the difference satisfies a predetermined condition). Here, the "composite-processing-set offset determination threshold value" (e.g., a value indicating that the number of sheets in one post-processed set is twice the number of sheets in one copy set) stored in the post-processing apparatus information storage sub-unit 3131 may be used for the predetermined threshold value.

If it is determined that the difference is no greater than or equal to the threshold value (No at step S1107), the printer control unit 305 outputs the printed sheets onto the tray 206 so that each set of the printed sheets of a copy included in the print setting information of the job is offset from the adjacent sets (step S1115). Processing may then be ended.

However, if it is determined that the difference is greater than or equal to the threshold value (Yes at step S1107), processing proceeds to step S1108 where the composite-processing-set offset control unit 312 outputs printed sheets of a first copy of the job onto the tray 206 without offsetting the sheets.

In step S1109, the composite-processing-set offset control unit 312 offsets a separator sheet output onto the tray 206. The type of the separator sheet may be determined by the operator. Alternatively, the type of the separator sheet may be determined by the composite-processing-set analyzing unit 311 in accordance with a predetermined rule. For example, as shown by the schematic illustration in FIG. 11, a separator sheet (e.g., second separator sheet) having a size one-size smaller than that of the printed sheets may be selected so that the inserted separator sheet does not enter the region of the printed sheets defined by the post-processed margin width when being offset. It should be noted that the size of the separator sheet is not limited to the size one-size smaller than that of the printed sheets, but may also have other sizes.

In step S1110, the composite-processing-set offset control unit 312 outputs the printed sheets of the first copy of the job onto the tray 206 without offsetting the printed sheets. Note that, while the description has been made in steps S1108 and S1110 with reference to the printed sheets output without being offset, the printed sheets may also be output while being offset in a direction opposite the direction in which the separator sheet is output so that the printed sheets do not overlap with the separator sheet, or an alternative method may be employed.

In step S1111, the printer control unit 305 determines whether the number of sheets in a set to be post-processed computed in step S1104 have been printed. If it is determined that the number of sheets in a set to be post-processed computed in step S1104 have been printed (Yes in step S1111), the processing proceeds to step S1112, as shown in FIG. 12B. However, if the number of sheets in a set to be post-processed have not yet been printed (No in step S1111), the processing returns to step S1109.

If, in step S1112, all the copies of the job have been printed (Yes in step S1112), the printer control unit 305 completes the processing flow shown in FIGS. 12A through 12B. However, if all the copies of the job have not yet been printed (No in step S1112), the processing proceeds to step S1113.

In step S1113, the composite-processing-set analyzing unit 311 rotates the orientation of an image to be printed 180 degrees.

In step S1114, the composite-processing-set offset control unit 312 prints a first copy of the job having the 180-degree rotated images to be printed and outputs printed sheets onto the tray 206. Through the processing performed in steps S1113 and S1114, as shown by the schematic illustration in FIG. 9, when the sets of sheets to be post-processed are placed in the offline post-processing apparatus 104 in the subsequent process, the positional relationship among an offset separator sheet, the processing margin, and the orientation of an image can be maintained unchanged. Note that the image rotation button 404 shown in the embodiment of FIG. 4 may be controlled so as to be enabled only when the result of the determination at step S1107 is "Yes". In such a case, in general, the image rotation button 404 is disabled by, for example, graying out the image rotation button 404. Alternatively, when the result of the determination at step S1107 is "Yes", the image rotation button 404 may automatically enter a specified state.

After the output performed in step S1114 is completed, the processing returns to step S1109.

The processing starting from step S1109 to step S1114 is repeated until the output of all of the copy sets is completed. As a result, the sheets are output onto the tray 206 so as to be stacked in a manner shown by the schematic illustration in FIG. 6.

If the result of the determination at step S1106 is "No" (No in step S1106), processing proceeds to step S1116 as shown in FIG. 12A, where the composite-processing-set offset control unit 312 prints one set of sheets to be post-processed of the job and outputs the sheets onto the tray 206 without offsetting the set.

In step S1117, the composite-processing-set offset control unit 312 outputs the set of sheets to be post-processed subsequent to the set output in step S1116 and offset-stacks the set onto the tray 206.

If, in step S1118, the number of sheets of a copy set specified in the job information of the job have been printed and output (Yes in step S1118), the processing proceeds to step S1119. However, if, in step S1118, the number of sheets of a copy set specified in the job information of the job have not yet been printed (No in step S1118), the processing returns to step S1117.

If, in step S1119, all of the copies specified in the job information of the job have been printed and output (Yes in step S1119), the flow of the series of processes is completed. However, if, in step S1119, all of the copies specified in the job information of the job have not yet been printed and output (No in step S1119), the processing proceeds to step S1120.

In step S1120, the composite-processing-set offset control unit 312 outputs a separator sheet so that the separator sheet is placed between the printouts.

The processing starting from step S1117 to step S1120 is repeated until the output of all of the copy sets is completed. As a result, the sheets are output onto the tray 206 so as to be stacked in a manner shown by the schematic illustration in FIG. 7.

An illustration of reason why, in step S1107, the processing may be branched to step S1115 or S1108 in accordance with whether the difference between the number of sheets in a single copy set of the job and the number of sheets in a set to be post-processed is greater than or equal to a predetermined threshold value is described next with reference to a particular example.

For example, let one copy set include 4 sheets, and let one set to be post-processed include 5 sheets. In addition, the threshold value used in step S1107 is 5, and the number of copies specified is 9.

When the number of output sheets per copy is 4 and the number of sheets in a set to be post-processed is 5, the difference between the numbers is 1. Accordingly, the processing proceeds to step S1115. Since the number of sheets placed in the feeder unit of the post-processing apparatus in the same batch is some of the sheets (4 sheets), the copy sets are offset-stacked. Thus, the operator can place each copy set of printed sheets in the post-processing apparatus. Since the post-processing apparatus can hold a printout of 5 sheets in the same batch, the number of the placed sheets is not limited to some of the sheets (4 sheets). However, if 5 sheets are placed in the post-processing apparatus, the first copy and a first page of the second copy are mixed. In general, the operator does not place the printout in such a manner. Accordingly, the processing in step S1115 is performed.

In contrast to this case, let one copy set include 4 sheets, and one set to be post-processed include 12 sheets.

In such a case, the difference between the numbers of sheets is 8. Accordingly, the processing proceeds step S1108. As a result, the sheets are output, as shown in FIG. 9. In this case, the operator can place three copy sets (totaling 12 sheets) in the post-processing apparatus in the same batch. Accordingly, the operator may need only three setting operations.

When the number of output sheets per copy set is 4 and the number of sheets per set to be post-processed is 12 and if only the copy set is offset-stacked, the operator cannot identify the set to be post-processed. Therefore, the operator can place only some of the sheets in the post-processing apparatus. As a result, the operator may need to perform nine setting operations.

By providing the processing performed in step S1107, the operation performed by the operator can be simplified.

While the present embodiment has been described with reference to the processing in which the sheets are output in a non-offset position in step S1108 and the sheets are output in an offset position in step S1109, the order of the offset stacking may be reversed. This can be applied to other steps.

The first embodiment has been described with reference to the case where a set of printed sheets to be post-processed is offset-stacked if it is determined that the number of sheets per copy set is greater than the number of sheets per set to be post-processed (No in step S1106). However, if a set of printed sheets to be post-processed is offset-stacked, the sheets of a plurality of copies may be included in one set of printed sheets to be post-processed.

According to the present embodiment, an example in which a set of printed sheets to be post-processed is offset-stacked and a copy set of printed sheets is also offset-stacked is described.

If the result of the determination made in step S1106 shown in FIG. 12A according to the first embodiment is "No", the composite-processing-set offset control unit 312, in step S1116, prints sheets for a set to be post-processed and outputs the printed sheets onto the tray 206 without offsetting the printed sheets.

Figure 13:
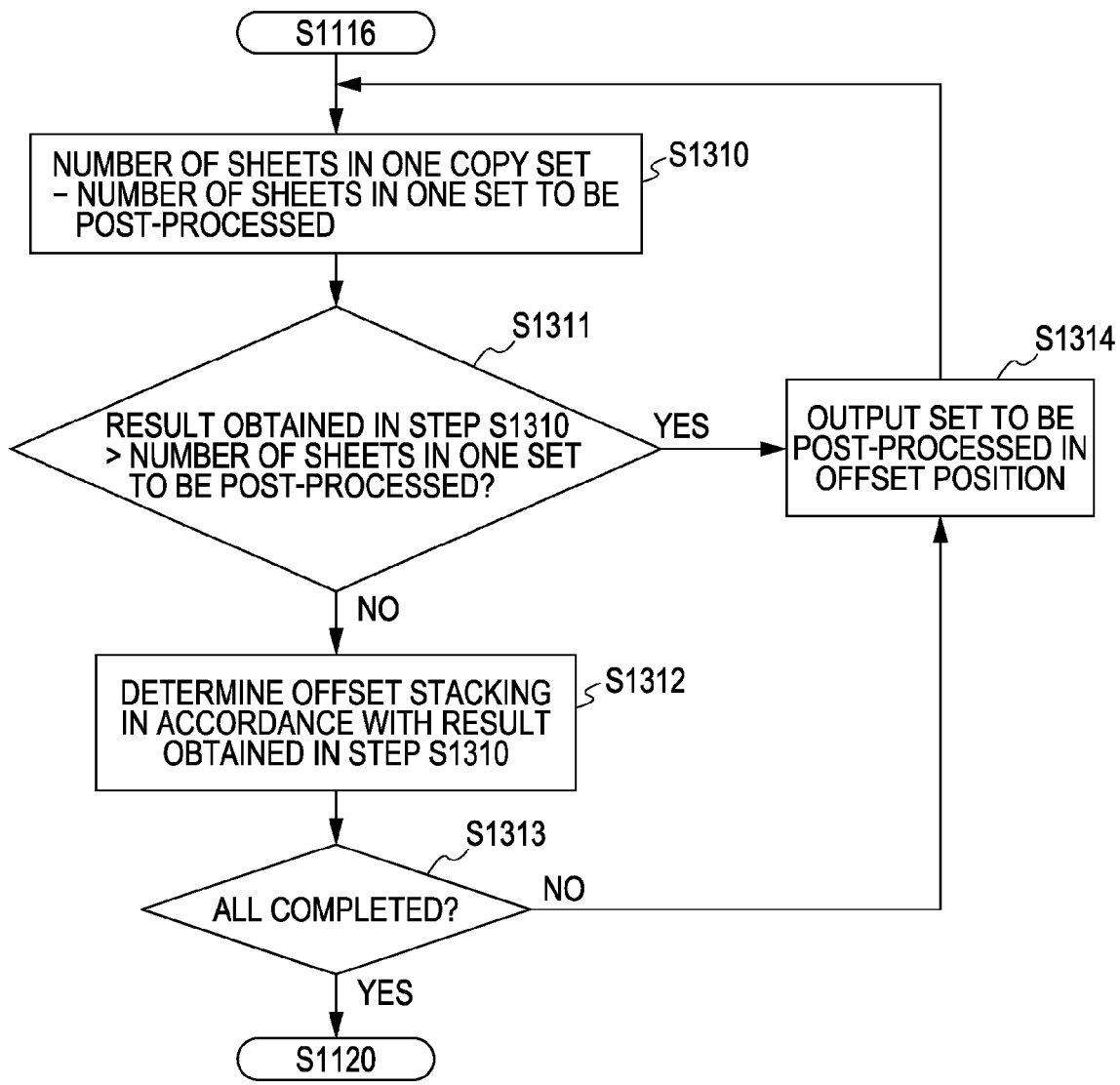
FIG. 13 is a flow chart of an example of an offset-stacking process of printed sheets based on a composite processing set.

Thereafter, as shown in the processing flow example of FIG. 13, the composite-processing-set offset control unit 312, in step S1310, subtracts the number of sheets in a set to be post-processed from the number of sheets in a copy set. In step S1311, it is determined whether the subtraction result is greater than the number of sheets in a set to be post-processed.

If it is determined that the subtraction result is greater than the number of sheets in a set to be post-processed (Yes in step S1311), the composite-processing-set offset control unit 312 outputs the next set of printed sheet to be post-processed while offsetting the set so that the printed sheets are stacked at a position different from that of the set of sheets stacked in step S1106 (step S1314).

Subsequently, the composite-processing-set offset control unit 312 subtracts the number of output sheets from the number of sheets in a copy set (step S1310). Thereafter, the determination is made again in step S1311.

However, if the result of the determination made in step S1311 is "No" (No in step S1311), the composite-processing-set offset control unit 312 then determines in step S1312 the offset stacking in accordance with the result obtains in step S1310, and then whether the processing is completed for all of the copy sets. If the processing has not yet been completed for all of the copy sets (No in step S1313), the processing proceeds to steps S1314 described above, and back to S1310. If the processing has been completed for all of the copy sets (Yes in step S1313), then processing proceeds to step S1120 as shown in FIG. 12A.

Figure 14:
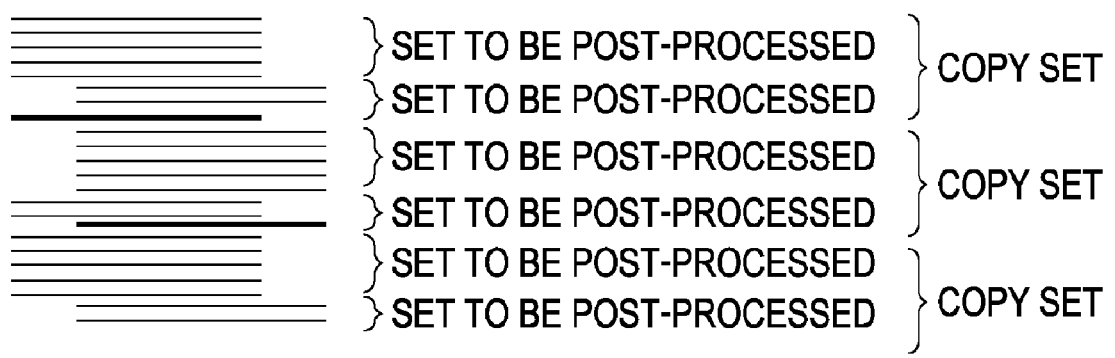
FIG. 14 is an example of a printout according to a second embodiment.

The example process performed in FIG. 13 is described next with reference to a particular example illustrated in FIG. 14.

Let one set to be post-processed by a post-processing apparatus include 5 sheets, and let one copy set include 7 sheets. In addition, the number of copies specified for the job is 3.

In such a case, the printing apparatus first outputs 5 sheets in a set to be post processed without offsetting the sheets (step S1116).

Subsequently, the number of sheets in a set to be post-processed (5 sheets) is subtracted from the number of sheets in a copy set (7 sheets) so that the result of subtraction (2 sheets) is obtained. Since this result is less than the number of sheets in a set to be post-processed (5 sheets) ("No" in step S1311), the printing apparatus outputs the two sheets, which are the sheets resulting from subtraction, while offsetting the sheets (step S1312).

The above-described processing is performed for each of the three copy sets, and a separator sheet is inserted between the copy sets. In this way, the stacks of the sheets shown in the example of FIG. 14 are obtained.

As described above, by separating the printed sheets for both the set to be post-processed and the copy set, the operator can easily identify the two types of sets and place the appropriate sets of printed sheets in the post-processing apparatus.

Aspects according to the present invention can also be achieved by supplying a storage medium (or a recording medium) storing software, program code and/or computer-executable instructions that achieves functions according to the above-described embodiments to a system or an information processing apparatus, and by causing the system or the information processing apparatus (e.g., a central processing unit (CPU)) to read and execute the program code and/or computer-executable instructions.

In such a case, the program code and/or computer-executable instructions itself as read out of the storage medium may realize functions according to the above-described embodiments. Therefore, the storage medium storing the program code and/or computer-executable instructions can also realize aspects according to the present invention. In addition, the functions of the above-described embodiments can be realized by a process in which an operating system (OS) running on the information processing apparatus executes at least some of the functions in the above-described embodiments under the control of the program code and/or computer-executable instructions.

Furthermore, after the program code and/or computer-executable instructions are read out of the storage medium and written to a storage medium of the information processing apparatus, the CPU may execute at least some and even all of the functions according to the above-described embodiments under the control of the program code and/or computer-executable instructions.

Still furthermore, aspects of the present invention may be realized through a process in which the program code and/or computer-executable instructions are distributed via a network and stored in a storage medium and, subsequently, the system and the information processing apparatus (e.g., the CPU) reads and executes the program code and/or computer-executable instructions.

According to aspects of the present invention, sets of the printed sheets to be post-processed in the same batch may be stacked so as to be distinguishable by an operator. Consequently, the operator can relatively easily place the sets of the printed sheets in a post-processing apparatus.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-146995 filed Jun. 4, 2008, which is hereby incorporated by reference herein in its entirety.

What is claimed is:

1. An image forming apparatus for processing a print job comprising:
    an acquiring unit configured to acquire information about an upper limit of printed sheets to be post-processed in same batch by a post-processing apparatus, the post-processing apparatus not being connected to the image forming apparatus via a conveying path of the print sheets output from the image forming apparatus;
    an analyzing unit configured to analyze the print job; and
    an output control unit configured to output printed sheets on the basis of the print job in which offset stacking is applied to a set of printed sheets to be post-processed by the post-processing apparatus defined in accordance with a result of analysis performed by the analyzing unit and information regarding the upper limit of printed sheets to be post-processed acquired by the acquiring unit.

2. The image forming apparatus according to claim 1, wherein the post-processing apparatus is a puncher that punches a hole in the printed sheets.

3. The image forming apparatus according to claim 1, wherein the output control unit offset-stacks each set of printed sheets to be post-processed and outputs a separator sheet on top of each copy set.

4. The image forming apparatus according to claim 3, wherein, in a case where post-processing performed by the post-processing apparatus is to be applied to both the printed sheets and the separator sheet even when the separator sheet is offset, the output control unit changes the separator sheet to a second separator sheet having a size smaller than that of the separator sheet.

5. The image forming apparatus according to claim 1, wherein, if a number of sheets obtained by subtracting a number of printed sheets in the set to be post-processed from a number of printed sheets in a copy set is smaller than the number of printed sheets in the set to be post-processed, the output control unit offset stacks the number of sheets obtained by subtracting the number of printed sheets in the set to be post-processed from the number of printed sheets in the copy set.

6. The image forming apparatus according to claim 1, wherein, when a number of printed sheets in a single copy set output by the print job is smaller than a number of printed sheets in the set to be post-processed in the same batch by the post-processing apparatus and if a difference between the number of printed sheets in the single copy set output by the print job and the number of printed sheets in the set to be post-processed in the same batch satisfies a predetermined condition, the output control unit rotates by 180 degrees images to be printed on sheets in a set to be post-processed subsequent to the set to be post-processed and outputs the sheets.

7. A control method for use in an image forming apparatus for processing a print job, the control method comprising:
    acquiring information about an upper limit of printed sheets to be post-processed in same batch by a post-processing apparatus, the post-processing apparatus not being connected to the image forming apparatus via a conveying path of the print sheets output from the image forming apparatus;
    analyzing the print job; and
    outputting printed sheets on the basis of the print job in which offset stacking is applied to a set of printed sheets to be post-processed by the post-processing apparatus defined in accordance with a result of analysis performed in analyzing the print job and information regarding the upper limit of printed sheets to be post-processed acquired in acquiring information about the upper limit of printed sheets to be post-processed.

8. The control method according to claim 7, wherein the post-processing apparatus is a puncher that punches a hole in the printed sheets.

9. The control method according to claim 7, wherein, in outputting of the printed sheets, each set of printed sheets to be post processed is offset-stacked, and a separator sheet is output each time outputting of the printed sheets is performed.

10. The control method according to claim 9, wherein, in a case where post-processing performed by the post-processing apparatus is to be applied to both the printed sheets and the separator sheet even when the separator sheet is offset, the separator sheet is changed to a second separator sheet having a size smaller than that of the separator sheet in outputting of the printed sheets.

11. The control method according to claim 7, wherein, if a number of sheets obtained by subtracting a number of printed sheets in the set to be post-processed from a number of the sheets output in outputting of printed sheets in a copy set is smaller than the number of printed sheets in the set to be post-processed, the number of sheets obtained by subtracting the number of printed sheets in the set to be post-processed from the number of sheets output in outputting of the printed sheets in the copy set are offset-stacked in outputting of the printed sheets.

12. The control method according to claim 7, wherein, when a number of printed sheets in a single copy set output by the print job in outputting of the printed sheets is smaller than a number of printed sheets in the set to be post-processed in the same batch by the post-processing apparatus and if a difference between the number of printed sheets in the single copy set output by the print job in outputting of the printed sheets and the number of printed sheets in the set to be post-processed in the same batch satisfies a predetermined condition, images to be printed on sheets in a set to be post-processed subsequent to the set to be post-processed are rotated by 180 degrees in outputting of the printed sheets.

13. A non-transitory storage medium having computer-executable instructions stored thereon for causing an image forming apparatus to perform a control method for processing a print job, the control method comprising:
  acquiring information about an upper limit of printed sheets to be post-processed in same batch by a post-processing apparatus, the post-processing apparatus not being connected to the image forming apparatus via a conveying path of the print sheets output from the image forming apparatus;
  analyzing the print job; and
  outputting printed sheets on the basis of the print job in which offset stacking is applied to a set of printed sheets to be post-processed by the post-processing apparatus defined in accordance with a result of analysis performed in analyzing the print job and information regarding the upper limit of printed sheets to be post-processed acquired in acquiring information about the upper limit of printed sheets to be post-processed.

14. The non-transitory storage medium according to claim 13, wherein the post-processing apparatus is a puncher that punches a hole in the printed sheets.

15. The non-transitory storage medium according to claim 13, wherein, in outputting of the printed sheets, each set of printed sheets to be post processed is offset-stacked, and a separator sheet is output each time outputting of the printed sheets is performed.

16. The non-transitory storage medium according to claim 15, wherein, in a case where post-processing performed by the post-processing apparatus is to be applied to both the printed sheets and the separator sheet even when the separator sheet is offset, the separator sheet is changed to a second separator sheet having a size smaller than that of the separator sheet in outputting of the printed sheets.

17. The non-transitory storage medium according to claim 13, wherein, if a number of sheets obtained by subtracting the number of printed sheets in the set to be post-processed from the number of the sheets output in outputting of the printed sheets in a copy set is smaller than the number of printed sheets in the set to be post-processed, the number of sheets obtained by subtracting the number of printed sheets in the set to be post-processed from the number of sheets output in outputting of the printed sheets in the copy set are offset-stacked in outputting of the printed sheets.

18. The non-transitory storage medium according to claim 13, wherein, when a number of printed sheets in a single copy set output by the print job in outputting of the printed sheets is smaller than a number of printed sheets in the set to be post-processed in the same batch by the post-processing apparatus and if a difference between the number of printed sheets in the single copy set output by the print job in outputting of the printed sheets and the number of printed sheets in the set to be post-processed in the same batch satisfies a predetermined condition, images to be printed on sheets in a set to be post-processed subsequent to the set to be post-processed are rotated by 180 degrees in outputting of the printed sheets.

* * * * *